United States Patent [19]

Wagor et al.

[11] 4,126,066
[45] Nov. 21, 1978

[54] BRAKE LATHE HARMONIC DAMPER

[75] Inventors: John C. Wagor; Robert W. Bradley, both of Cedar Rapids, Iowa

[73] Assignee: Kwik-Way Manufacturing Company, Marion, Iowa

[21] Appl. No.: 832,342

[22] Filed: Sep. 12, 1977

[51] Int. Cl.² ........................... B23B 3/22; F16F 15/10
[52] U.S. Cl. ........................................ 82/4 A; 74/574
[58] Field of Search ................ 82/4 A, 38 A, DIG. 9; 74/574

[56] References Cited

U.S. PATENT DOCUMENTS

| 525,468 | 9/1894 | Northrop | 74/574 |
|---|---|---|---|
| 1,107,731 | 8/1914 | Vold | 74/574 |
| 2,306,959 | 12/1942 | Knibbe | 74/574 |
| 2,514,139 | 7/1950 | O'Connor | 74/574 |
| 3,296,888 | 1/1967 | Schweitzer | 74/574 |
| 4,044,627 | 8/1977 | Zander | 74/574 |

Primary Examiner—Harrison L. Hinson
Attorney, Agent, or Firm—Hill, Gross, Simpson, Van Santen, Steadman, Chiara & Simpson

[57] ABSTRACT

A damper for use with work arbors supported at only one end is disclosed which acts to reduce harmonic vibration and chatter as the arbor rotates and a cutting tool operates on the workpiece. The damper consists of a damping collar, with an interior radius greater than the exterior radius of an associated spacer, which freely rotates on that spacer such that the collar rotates independently of the work arbor at a speed of about 66% of the arbor's speed and acts to suppress undesirable chatter, and harmonic vibrations.

2 Claims, 3 Drawing Figures

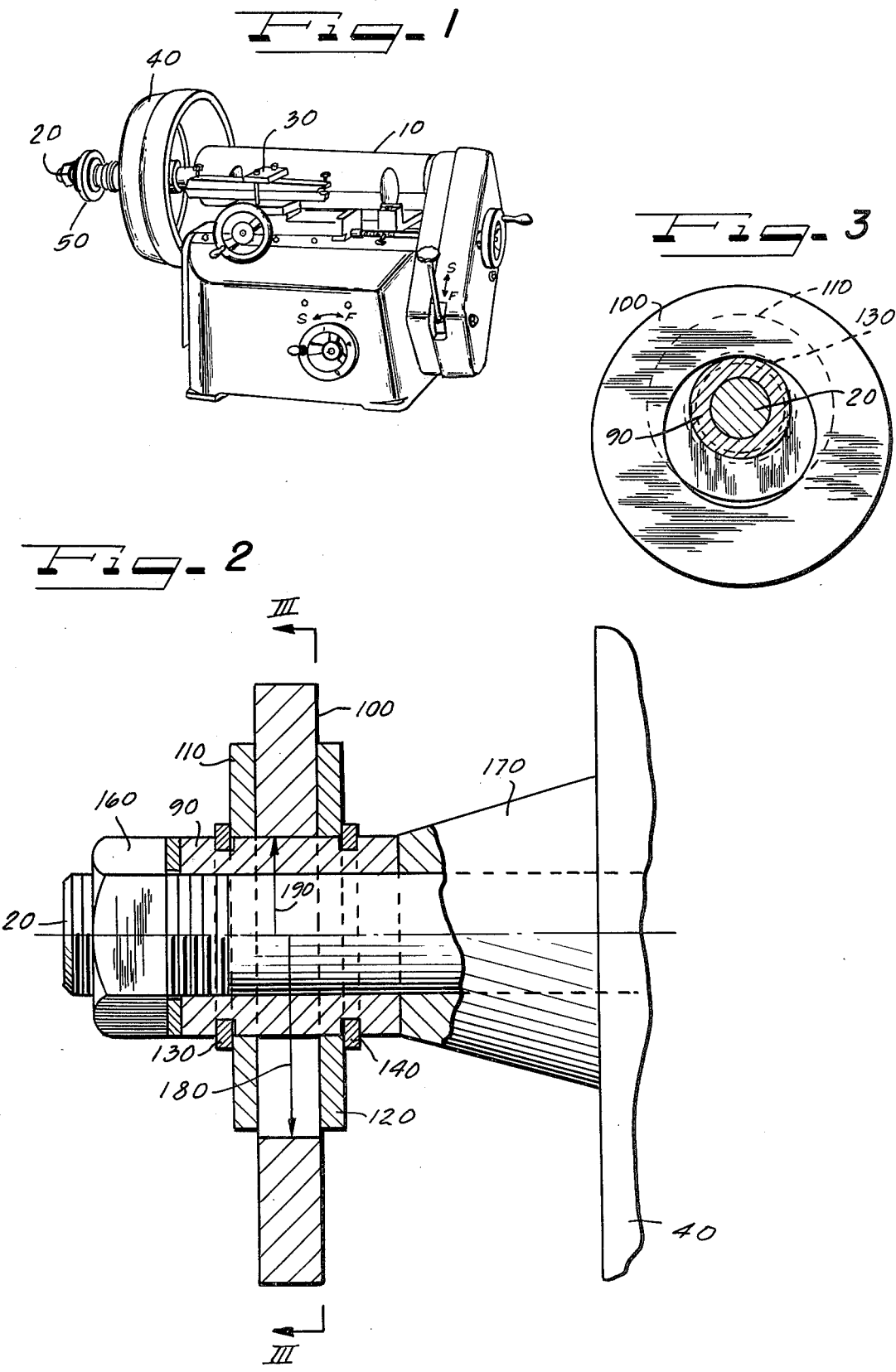

BRAKE LATHE HARMONIC DAMPER

BACKGROUND OF THE INVENTION

In cases of machine tools, particularly lathes having a work arbor which is supported at only one end, it is a known problem that the imbalances in the workpiece as well as lateral forces due to the cutting cause vibrations and chatter which are extremely undesirable. Previous attempts to deal with this problem have involved the mounting of steel rings on the arbor.

BRIEF SUMMARY OF THE INVENTION

It is an objective of the invention to reduce chatter and harmonic vibrations found in arbors supported at only one end due to imbalances in the workpiece and lateral forces due to the cutting tool operating on the workpiece.

The invention comprises an annular ring having interior diameter greater than an associated spacer which is operably mounted on said spacer such that if said spacer is mounted upon the arbor, said annular ring can rotate freely about an axis of rotation of the arbor simultaneously with being able to move in a direction perpendicular to the axis of rotation of the arbor.

BRIEF DESCRIPTION OF THE FIGURES

FIG. 1: Illustrates a typical lathe having a work arbor supported only at one end.

FIG. 2: Illustrates a side view of the subject invention mounted on a work arbor.

FIG. 3: Illustrates a cross-section of the subject invention mounted on a work arbor.

DETAILED DESCRIPTION OF THE PREFERRED EMBODIMENTS

FIG. 1 illustrates a lathe 10 with a work arbor 20, a carriage 30 for the cutting tool, a workpiece 40 and the damper 50 mounted on the arbor 20. Lathe 10 is typical of those used to resurface or "turn" brake drums. The construction is such that the work arbor 20 is supported only at one end. Though the inventive damper 50 is shown on a special purpose lathe, the invention is by no means restricted to use only on such machines. The damper 50 is mounted onto the arbor 20 and during the period of time that the lathe 10 is running it acts to suppress undesired chatter of the arbor 20 especially when the tool mounted on the carriage 30 is cutting metal.

FIG. 2 illustrates a side view of the arbor 20 upon which is mounted a spacer 90 which supports the damping collar 100 between a pair of side plates 110, 120 which in turn are laterally fixed by a pair of snap rings 130, 140. A nut 160 holds the damper assembly against the workpiece 40 by means of a spacer 170. It should be noted that the damping collar 100 has the shape of an annular ring with an interior radius 180 which exceeds the exterior radius 190 of the spacer 90. Thus, the damping collar 100 is free to rotate independently of the arbor and move in a plane perpendicular to the axis of rotation of the arbor 20. The slip rings 130, 140 assure mechanical integrity of the assembly comprised of the damper collar 100 and the side plates 110, 120 when the arbor 20 is rotated but exert no frictional forces against the damper collar 100 via the side plates 110, 120. Thus the damper collar 100 is able to rotate freely. When the arbor 20 is rotating, the damper collar 100 also rotates but at only about ⅔ the arbor's speed. This independent movement and slower speed helps eliminate any harmonic vibration and chatter in the workpiece 40 as the arbor 20 rotates.

FIG. 3 illustrates an end view looking from the workpiece 40 at cross-section III. The arbor 20, the spacer 90, the damping collar 100, the sideplate 110 which is behind the collar and the retaining ring 130 which is also behind the collar are shown therein.

Applicant has found that the best results occur where the damping collar 100 is made of steel with an interior diameter of 2 inches and an external diameter of 4½ inches with a thickness of ⅜ inch. The exterior diameter of the spacer 90 should be about 1¼ inches for best results.

One skilled in the art will recognize that numerous changes and modifications could be made in the disclosed embodiment without departing from the scope or essence of the invention.

We claim as our invention:

1. A damper for use with an arbor upon which an object could be mounted comprising a damping collar, and a cylindrically shaped spacer; said spacer being operably mounted upon the arbor so that it rotates in conjunction with the arbor and said damping collar being operably mounted upon said spacer such that said damping collar rotates freely about an axis essentially parallel to the axis of rotation of the arbor simultaneously while being free for limited movement in a plane perpendicular to the axis of rotation of the arbor such that harmonic vibration and chatter in the object is minimized; said spacer being formed with a pair of grooves on opposite sides of said damping collar and a pair of snap rings receivable in said pair of grooves to limit the longitudinal motion of said damping collar; and including a pair of side plates receivable over said spacer between said snap rings and said damping collar.

2. An arbor damped to prevent vibration, comprising: a rotatable arbor having a free end and supported in cantilever fashion at an opposite end; mounting means for holding a work-piece on the arbor; damping means on the arbor positioned between the free end and said mounting means; and said damping means comprising a spacer operably mounted on the arbor to rotate therewith, a damping collar operably mounted on the spacer so as to rotate freely with respect to the spacer and about an axis essentially parallel to the axis of rotation of the arbor while also being free for limited movement in a plane perpendicular to the axis of rotation of the arbor, a pair of side plates movably receivable over said spacer and positioned adjacent the collar with one plate on each side of the collar, and limiting means on the arbor adjacent each side plate for limiting longitudinal motion of the side plates and collar.

* * * * *